US006611754B2

(12) United States Patent
Klein

(10) Patent No.: US 6,611,754 B2
(45) Date of Patent: Aug. 26, 2003

(54) ROUTE PLANNING SYSTEM

(75) Inventor: Bernhard Klein, Regensburg (DE)

(73) Assignee: Siemens VDO Automotive AG, Frankfurt (DE)

( * ) Notice: Subject to any disclaimer, the term of this patent is extended or adjusted under 35 U.S.C. 154(b) by 91 days.

(21) Appl. No.: 09/802,388

(22) Filed: Mar. 9, 2001

(65) Prior Publication Data

US 2001/0025221 A1 Sep. 27, 2001

(30) Foreign Application Priority Data

Mar. 14, 2000 (EP) ............................................ 00200909

(51) Int. Cl.[7] ................................................ G01C 21/00
(52) U.S. Cl. ....................................................... 701/209
(58) Field of Search ................................ 701/201, 202, 701/204, 207, 209, 25; 340/988; 342/357.01, 357.13

(56) References Cited

U.S. PATENT DOCUMENTS 5,541,845 A * 7/1996 Klein ......................... 701/207
5,905,451 A 5/1999 Sakashita .................... 340/988
6,144,917 A * 11/2000 Walters et al. .............. 701/204

FOREIGN PATENT DOCUMENTS

JP 10318771 4/1998 ........... G01C/21/00

* cited by examiner

*Primary Examiner*—Yonel Beaulieu
(74) *Attorney, Agent, or Firm*—Mayer, Brown, Rowe & Maw

(57) ABSTRACT

A route planning system is provided with various interlinked facilities, including a user I/O facility, a route planning facility, a position determination facility, and a destination table facility. Under control of a set of start and/or destination requests from a user person a route plan to be traveled is generated. In particular, the system further includes a driving habit assessment facility for assessing a particular user person's driving habits as additional input data for the route planning facility. On the basis of averaging the user person's driving habits the route generation is influenced in the time domain and/or in the spatial domain.

8 Claims, 2 Drawing Sheets

ROUTE PLANNING SYSTEM

BACKGROUND OF THE INVENTION

The invention relates to a route planning system provided with various interlinked facilities, including a user I/O facility, a route planning facility, a position determination facility, and a destination table facility, for under control of a set of start and/or destination requests from a user person generating a route plan to be traveled.

PCT International Patent Application No. WO 93/09511, PCT US92/08104, in particular page 4, discloses a system for in specific manners directing respective drivers that may have various personal preferences such as to prefer quiet driving versus fast driving, and congested routes versus non-congested routes. Although the prior art system helps to choose the actual route whilst accommodating to a user person's wishes, actual planning of the travel, especially in a broader environment such as a company travel planning system, should also know actual traveling times in advance. It has been found that all existing route planning systems will only output a "best" route. The inventor of the present invention has recognized that personal driving habits represent a very relevant parameter that should be taken into account for the route planning, such as in the spatial as well as in the temporal domain. In the spatial domain certain driver categories may need another optimum route than others. In the temporal domain, differences in actual traveling time may cause variations in traveling schedules, such as when having various persons attending a single meeting at a pre-specified time instant.

BRIEF SUMMARY OF THE INVENTION

In consequence, amongst other things, it is an object of the present invention to provide a route planning system that allows to assess driver's past habits as additional data for the planning. Now, therefore, according to one of its aspects the invention is characterized in that said system furthermore comprises a driving habit assessment facility for assessing a particular user person's driving habits as additional input data for said route planning facility for on the basis of averaging said user person's driving habits selectively co-controlling said generating.

The invention also relates to a method for operating a route planning system as claimed in claim 1. Further advantageous aspects of the invention are recited in the dependent claims.

DESCRIPTION OF THE DRAWINGS

These and further aspects and advantages of the invention will be discussed in more detail hereinafter with reference to the disclosure of preferred embodiments, and in particular with reference to the appended figures that show.

DETAILED DESCRIPTION OF THE INVENTION

Figure 1:
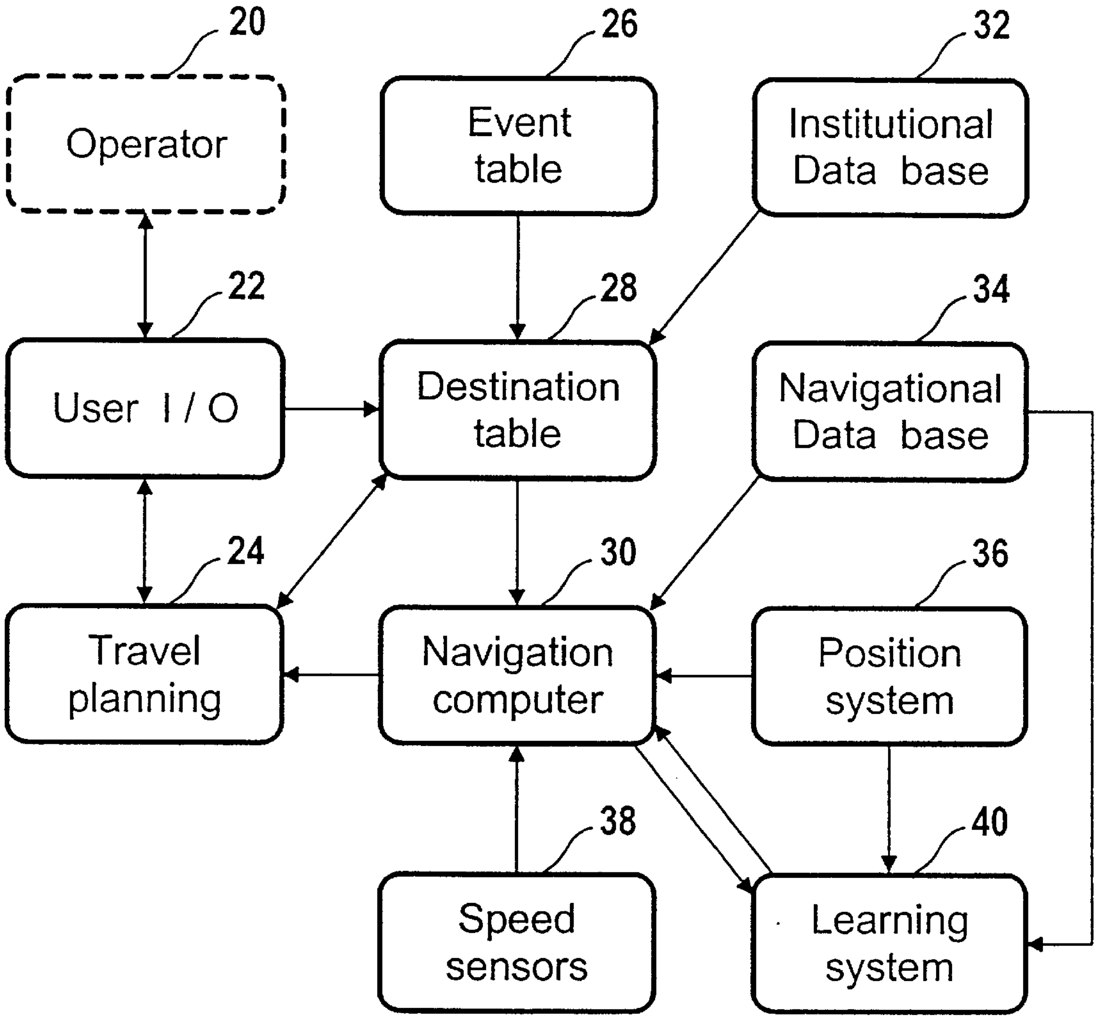
FIG. 1 shows an overall diagram of a system according to the invention.

The invention allows navigation systems that inter alia can estimate traveling times between two or more locations to improve this estimating through assessing the driving habits of a particular driver. This allows a more accurate prediction of an expected traveling time. In certain situations, this may relieve the requirements for taking into account time margins in the planning of traveling schedules, and thus effect a saving in time. For such assessing, the present invention would not need to ask a user additional explicit questions, such as a preference for fast, versus slower but scenic routes. Such asking is not covered by the present invention, but could instead be used as additional determinative input information.

Present-day route planning systems will often operate in two steps: first the optimum route is determined, followed by estimating the traveling time as based on average speeds that appear relevant on a particular road category. For example, a multi-lane motorway will generally allow much higher speeds than a two-lane rural road, that may also be used by numerous agricultural machines drawn by slow-moving tractors. However, individual drivers still may have widely ranging driving habits that may influence average speeds enormously.

Such habits could include the cruising speed that may further depend individually on various external parameters such as the time-of-day, a person's tendency to overtaking slow-moving vehicles, or the habit to prefer certain routes such as sneak-around routes, over other routes such as normal routes. The invention should allow to assess such individual habits for use in an improved schedule for predicting calculated traveling times. Furthermore, when a plurality of persons may use a particular car, such as a couple, or various personnel in case of a company car, the system should be able to recognize an actual user person. Such recognizing can be done in various manners, such as through user recognition on the basis of speech, or on the basis of a personal code, such as by keying or through entering a personal ID card.

The calculating of a traveling time prediction deteriorates with the actual user person deviating farther from the average user person's habits. Generally, many persons will keep more or less to standard speeds, such as 140 kms/hr on Motorways versus 40 kms/hour in built-up areas. However, many variations occur for old versus young people, men versus women, veteran drivers versus rookies, senior company executives versus junior apprentices, and many others that cannot be categorized.

The invention should allow the route planning system to have a more accurate estimation of the traveling time through assessing a user person's habits in a learning procedure. The necessary data can be acquired through speed sensors, in combination with the information of an actual route being traveled. The latter information would of course be provided by the route planning system itself through some localizing technique. This information so acquired can be averaged and inputted into the data base as a particular user person's driving idiosyncrasy. In principle, the learning curve can be made long, such as through covering many weeks or many thousands of kilometers. Alternatively, also quite recent elements of personal behavior can be taken into account, such as pertaining to a few days, or even that of the actually covered journey in a dynamic input for the route that actually has been planned. In principle, the short-time assessed information can be compared to long-time driving habits of the person in question, or of the driving community on the average, and differences presented to the user person, such as in the form of a warning message.

FIG. 1 shows an overall diagram of a system according to the invention, that by way of example has eleven subsystems, as follows. Block 20 symbolizes a user person who wants to be guided by the system. The user interfaces bidirectionally to the system's I/O that may have various hardware and software facilities such as keyboard, mouse, speech, other audio, and display. Block 32 represents an Institutional Data Base that may store various entries, such as representing hotels, restaurants or other facilities, together with associated data such as location, business hours, and actual services present at those facilities. Block 34 represents a Navigational Data Base that may comprise a road network, together with physical distances or travel time distances between representative points, road classification, and others. Block 36 represents a Position System that detects an actual position of the vehicle, such as through using a well known GPS system. Block 26 represents an Event Table, such as a road block or jam situation that has been communicated by a higher level authority such as a Radio Data System, and which event may cause a certain destination to be no longer reachable, or only in a delayed manner, or which may necessitate the vehicle to take a detour.

Block 28 represents a Destination Table that contains the destinations and associated timing indications, such as entered by the user through block 22, and subject to information from the Travel Planning in block 24, the Institutional Data Base in Block 32, and the Event Table in block 26. Block 30 represents a Navigational Computer that is fed with the Destination Table from block 28, with the Navigational Data Base from block 34, and with the Position from block 36; from this information it can figure out a route to be taken, which route may contain various interval points and furthermore, timing indications associated to the various Interval Points. Block 24 represents the Travel Planning that is fed by the information from the navigational computer 30, and which block 24 furthermore bidirectionally interfaces to the Destination Table in Block 28, and to the User I/O in Block 22. The Travel Planning will update the Destination Table if it fails to find a correct solution for attaining all Interval Points, and it will signal the User what Route is to be taken, as well as will signal the above Failure to allow the user to modify the set of Interval Points and/or associated timing indications. The above represents a comprehensive car navigation system for the present invention, the items 30, 34, 36, 38, 40 are especially relevant, whereas certain others such as 32 may not always prove to be indispensable.

Now, a further input to the system in the present embodiment are one or more speed sensors 38, that in the present system have not been used for by integration determining the actual position of the vehicle. The sensors measure actual vehicle speed that may be displayed to a driver or not. The speed so measured is presented to the navigational computer subsystem 30 that in consequence may associate a particular route or street or route category with the actually attained driving speed of the vehicle in question. The combined data are sent to the learning subsystem 40 that can associate a particular route or route category with an actual average speed attained over the route in question. If feasible, this average speed may be further specified for a time-of-day, character of the whether, or other feature, which feature may operate as an overlay over the particular driver's driving habits, or even be tailored to the particular driver's habits viz a viz this particular parameter. For example, motorway cruising speed may lie between 120 kms/hr and 200 kms/hr. Some persons will drive faster by night, while others tend to slow down. Many other variations are possible in an often unpredictable manner, absent the information of a particular person's driving habits. The learning system may furthermore receive appropriate information from the navigational data base and from the position determining system, as appropriate. The latter two may also present the category of the route actually being traveled. In subsequently estimating the traveling time, the learning system 409 will have stored data acquired thereby into the navigational data base, with the person's identity as a further qualifier. The recognizing of the user person's identity may ensue via user I/O subsystem 22 in a manner that has been suggested supra or otherwise, in a manner that by itself is not pertinent to the present invention.

Figure 2:
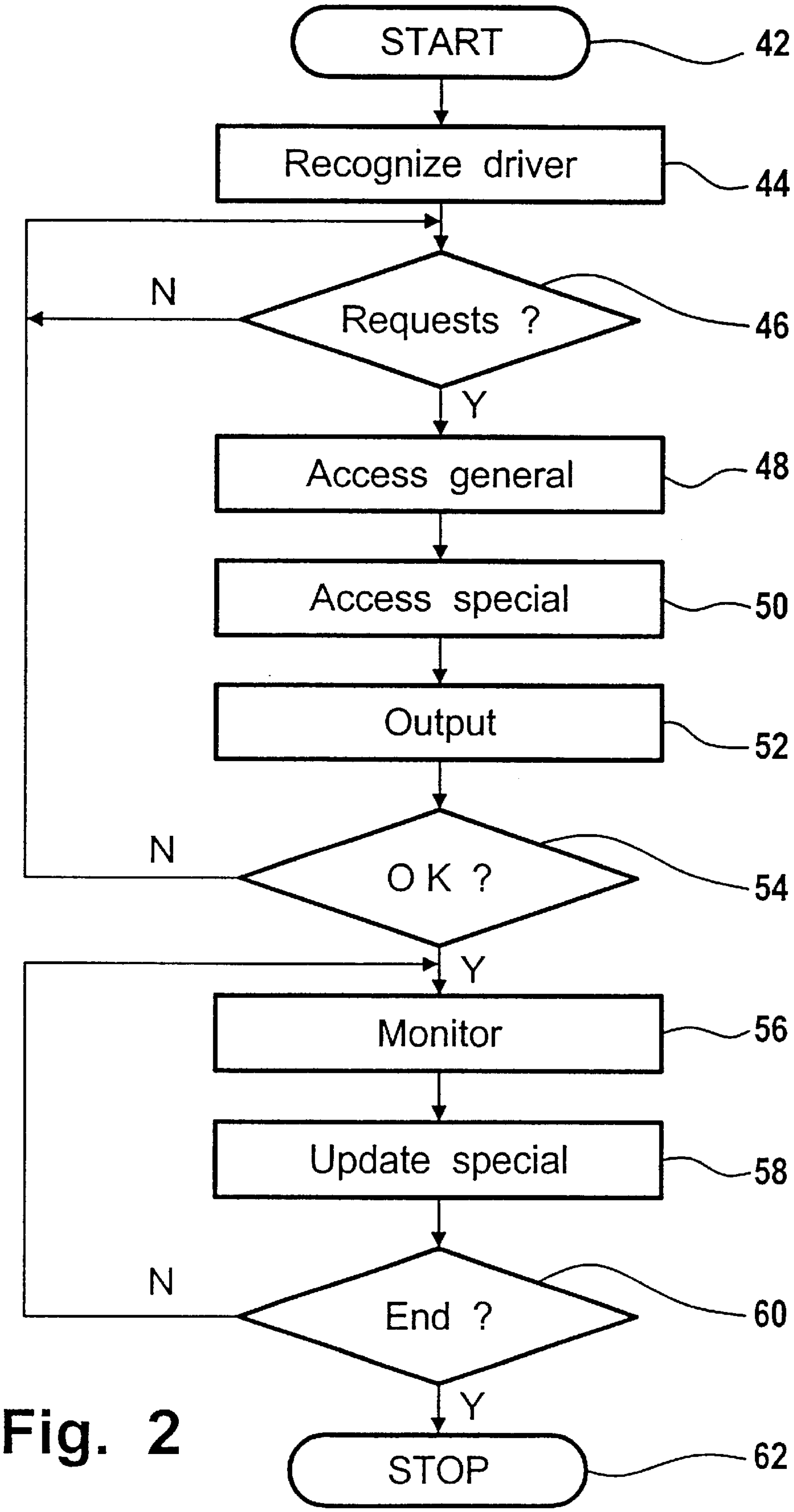
FIG. 2 is an applicable flow chart.

FIG. 2 is an applicable flow chart of the operation of the route planning system according to the invention. In block 42, the system is started, and the necessary hardware and software facilities are assigned. In block 44, the system self-reliantly executes various tasks, such as for recognizing the user person. In block 46, it checks for the presence of user requests. If absent (N), a waiting loop is executed. If all user requests will have been received (Y), the system in block 48 will access general information, such as for the geographical planning of the route. If ready, the system in block 50 will access such data as are specific for the user person in question, such as the speed attained on earlier journeys on roads of the same characterization, or even on the particular road in question. This will allow the system to estimate actual traveling time. In block 54 the result is presented to the user, such as by displaying an actual schedule. If this is not O.K. (n), a signalization in case by the user will drive the system back to block 46, such as for adding or deleting a destination location. If O.K. (Y), the journey is assumed to be undertaken, and the system in block 56 monitors the progress. In doing so, the special data are updated, either as regarding the driver's average behavior or habits, or as regarding the driver's instantaneous behavior on this particular day or route. This may lead to updating the overall information for the driver, or even the best route for the day's journey. For clarity, an associated route through the flow diagram has been omitted, as having various other features, that be themselves are not deemed necessary to disclose the general nature and principle of the present invention. Upon arriving at the end of the journey, yes in block 60, the system goes to block 62 that terminates the operation at least for the time being. Otherwise (N), the monitoring proceeds.

The person skilled in the art of route planning will recognize further policies to be followed within the ambit of the present invention, the scope of which has justfully been determined by the appended claims hereinafter. For example, the time calculation may be done for different possible routes that for the average driver will have nearly equal travel times, but where the particular driver would need more time for either a first road of the pair, or the second one. This would then influence the outcome of the route planning in the spatial domain.

What is claimed is:

1. A route planning system comprising:

various interlinked facilities, including a user I/O facility, a route planning facility, a position determination facility, and a destination table facility, for under control of a set of start and/or destination requests from a user person generating a route plan to be traveled;

a driving habit assessment facility for assessing a particular user person's driving habits as including both static and temporal data with respect said driving as additional input data for said route planning facility for on the basis of averaging said user person's driving habits selectively co-controlling said generating; and wherein the route plan includes a set of spatial location indications pertaining to said route plan and one or more temporal indications each regarding a particular instant in time associated to an actual or expected presence of said user person at a location given by a particular one of said spatial location indications.

2. A system as claimed in claim 1 characterized in that said driving habits foremostly comprise actually measured traveling speeds on various routes and/or route categories.

3. A system as claimed in claim 1, characterized by recognizer means for recognizing a particular user person's identity for selecting among stored driving habits associated to various different user persons.

4. A method for operating a route planning system, said method comprising:

requesting a user person to enter a set of start and/or destination requests;

generating a route plan to be traveled through using various interlinked facilities, including a user I/O facility, a route planning facility, a position determination facility, and a destination table facility;

assessing a particular user person's driving habits as additional input data for said route planning facility as including both static and temporal data with respect to said driving for subsequently on the basis of averaging said user person's driving habits selectively co-controlling said generating; and wherein the route plan includes a set of spatial location indications pertaining to said route plan and one or more temporal indications each regarding a particular instant in time associated to an actual or expected presence of said user person at a location given by a particular one of said spatial location indications.

5. A method as claimed in claim 3, characterized by furthermore a user person's identity being recognized as additional selection input for selecting past assessed driving habits for a plurality of user persons.

6. A method as claimed in claim 3, characterized in that said assessing is used as a dynamic input with a short averaging interval for an actual route being planned.

7. The system of claim 1 wherein said assessing considers various external circumstances or situations as influencing said driving habits as well as regarding said planning activity for codetermining said route planning.

8. The method of claim 4 wherein assessing driving habits includes measured traveling speeds on various particular routes as additional input data for said route planning facility.

* * * * *